March 6, 1934.   J. DEDIEU   1,950,228

ROTARY INTERNAL COMBUSTION ENGINE

Filed April 6, 1931   4 Sheets-Sheet 1

Inventor
J. Dedieu
By [signature]
Atty

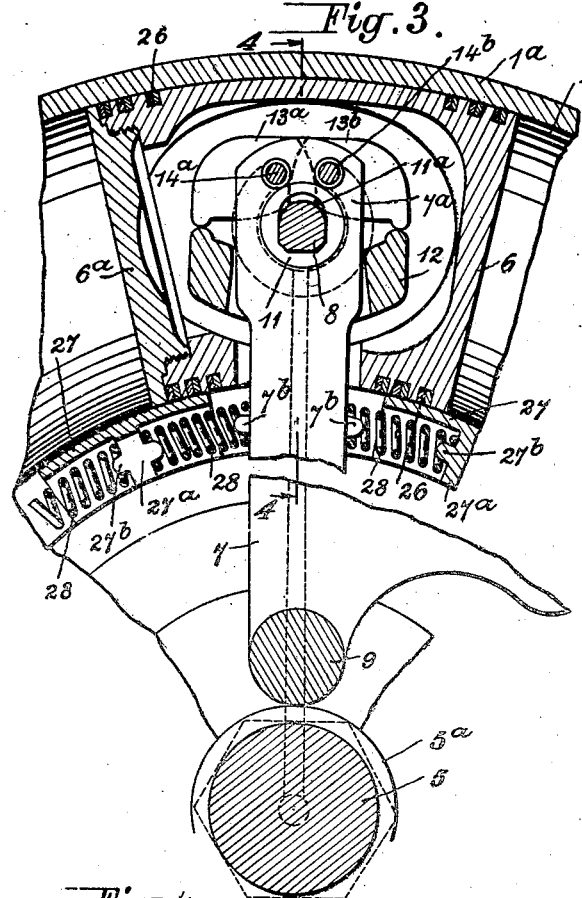
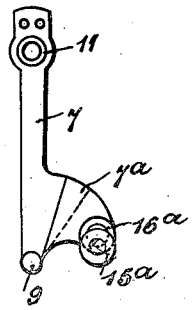
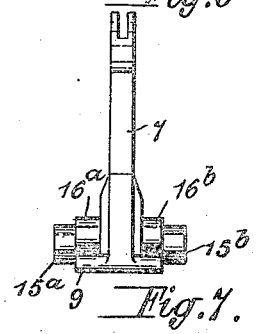
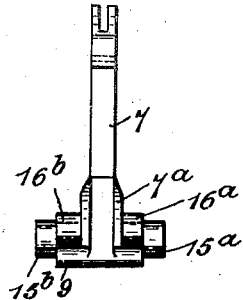
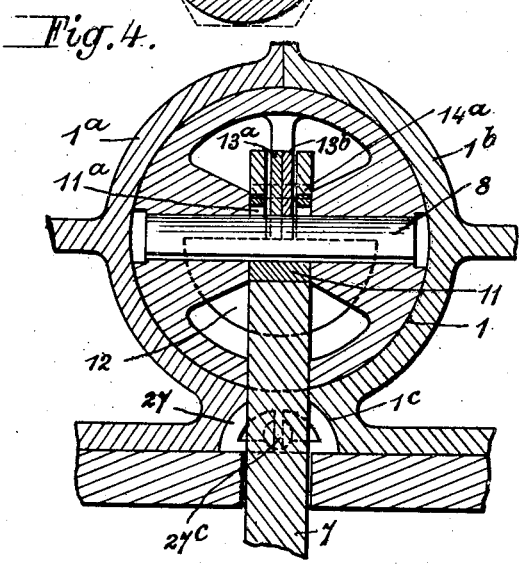

March 6, 1934.   J. DEDIEU   1,950,228
ROTARY INTERNAL COMBUSTION ENGINE
Filed April 6, 1931   4 Sheets-Sheet 4
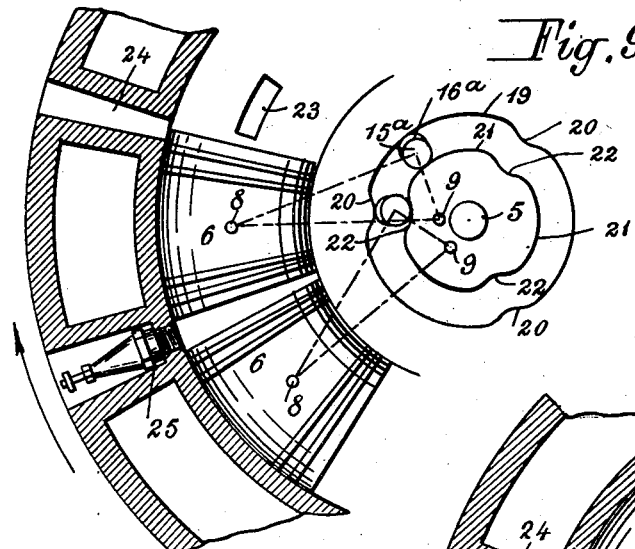
Fig. 9.
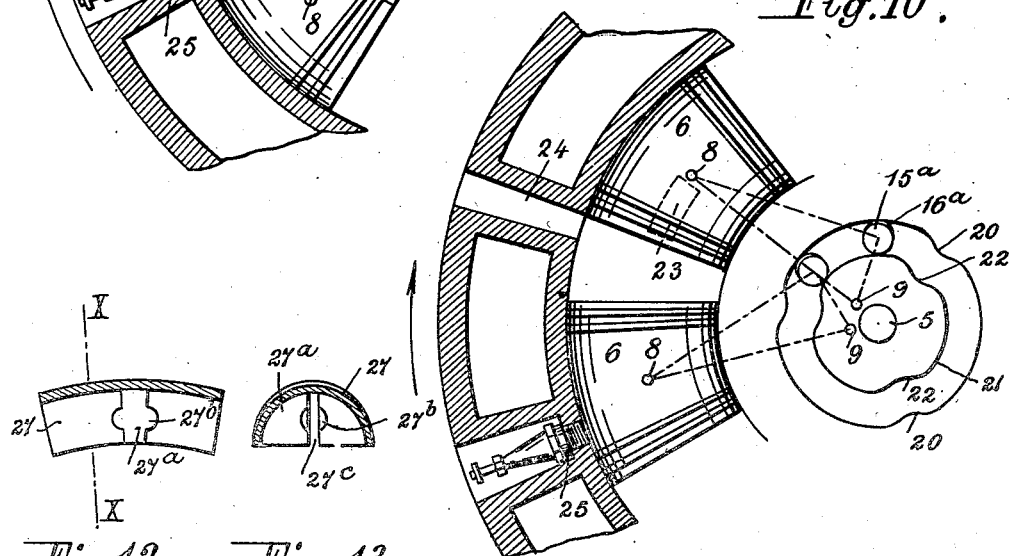
Fig. 10.
Fig. 12.   Fig. 13.
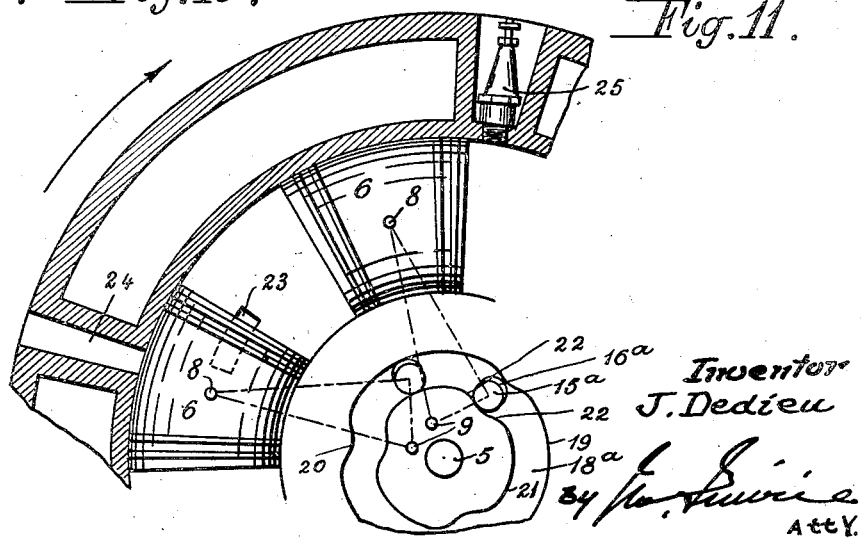
Fig. 11.
Inventor
J. Dedieu
By
Atty.

Patented Mar. 6, 1934

1,950,228

UNITED STATES PATENT OFFICE 1,950,228

ROTARY INTERNAL COMBUSTION ENGINE

Jean Dedieu, His par Castagnede, France

Application April 6, 1931, Serial No. 528,202
In France April 14, 1930

5 Claims. (Cl. 123—11)

The present invention relates to internal combustion engines in which the reciprocating motion of the pistons and piston rods, such as takes place in the usual engines, is replaced by a continuous rotary motion, as in turbines, and in which it is possible to obtain, in an apparatus of small size, for each revolution of the driving shaft, a much greater number of power strokes than in the known engines.

The said engine consists essentially of a main body having the form of a hollow torus, in which pistons of suitable shape are movable; between the adjacent ends of said pistons are spaces which form the working chambers and are adapted to move successively into coincidence with admission and exhaust ports formed in the wall of the torus, said pistons being connected with the driving shaft, which is coaxial with the torus, by means of elements which allow them a certain angular movement with reference to said shaft. The apparatus comprises a set of cams adapted to periodically increase the periphery speed of each piston with reference to that of the two adjacent pistons in order to effect a compression in the chamber in front of it and a suction in the chamber in its rear; fastening means are provided by which during the expansion which takes place in each chamber, the front piston can be positively secured to the piston, while preventing the back piston to move to the rear.

The said engine offers great advantages over the known engines.

In the first place, the reciprocating motion is replaced by a continuous rotary motion, thus obviating all dead centres and abrupt motion when running.

On the other hand, by a suitable arrangement of the admission and exhaust ports upon the walls of the torus, and due to the relative movements of the pistons, it is possible to obtain in each working chamber the normal phases of four-stroke engine, while avoiding the use of valves.

The present engine will also afford several power-producing cycles per revolution of the shaft, for each of the working chambers. It is only necessary to provide at regular intervals on the periphery of the torus the proper number of devices for admission, ignition and exhaust corresponding to the number of cycles per revolution of the shaft which are to be obtained. As above stated, each revolution of the shaft will correspond to a much greater number of power strokes than in the known engine, with an apparatus of reduced size.

Due to these various features, the said engines, the subject-matter of the present invention, will have an increased efficiency as concerns mechanical work and heat, and in relation to its size.

The engine will operate with equal facility by the use of explosions, employing gasoline and with electric ignition, or on the Diesel principle, with heavy oil feed and preliminary compression.

The accompanying drawings show by way of example an engine constructed in accordance with the invention and operating by explosions.

Fig. 3 is a section on a larger scale on the plane of the vertical axis of one of the pistons.

Fig. 4 is a vertical section on the line 4—4 of Fig. 3.

Figs. 5, 6 and 7 show one of the piston rods connecting the pistons with the driving shaft.

Figures 9, 10 and 11 are broken views, partly in section and elevation and partly diagrammatic, illustrating two pistons in the positions that they successively occupy during the working cycle.

Figure 12 is a longitudinal section of the packing member.

Figure 13 is a section on the line XIII—XIII of Figure 12.

Figure 1:
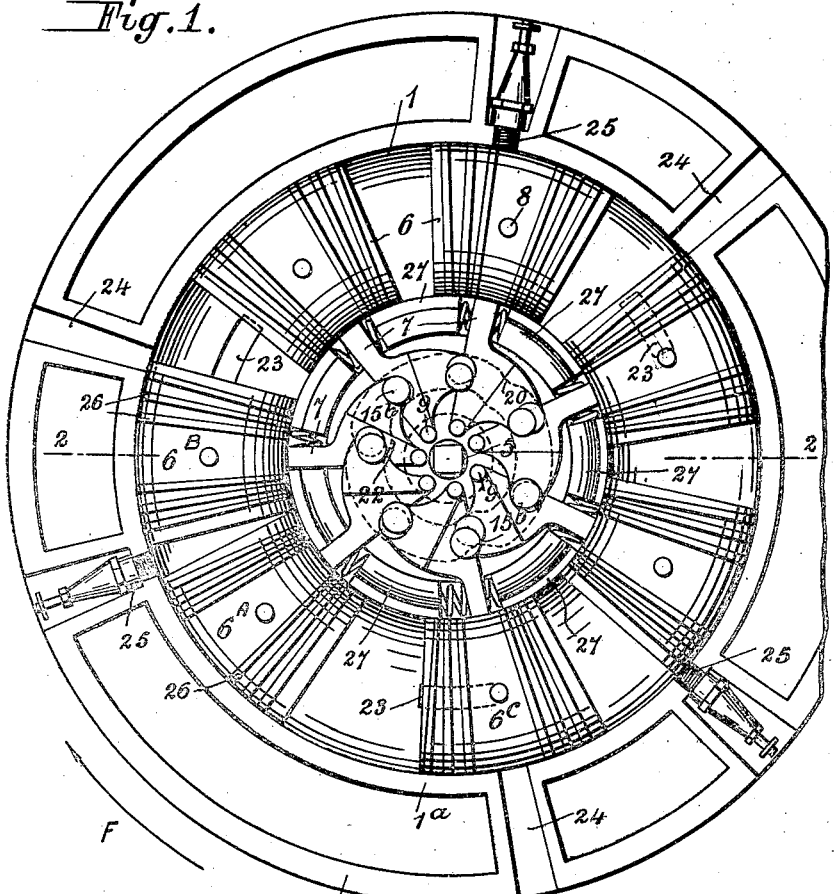
Fig. 1 is an elevational view of the engine, with one-half of the torus removed.
Figure 2:
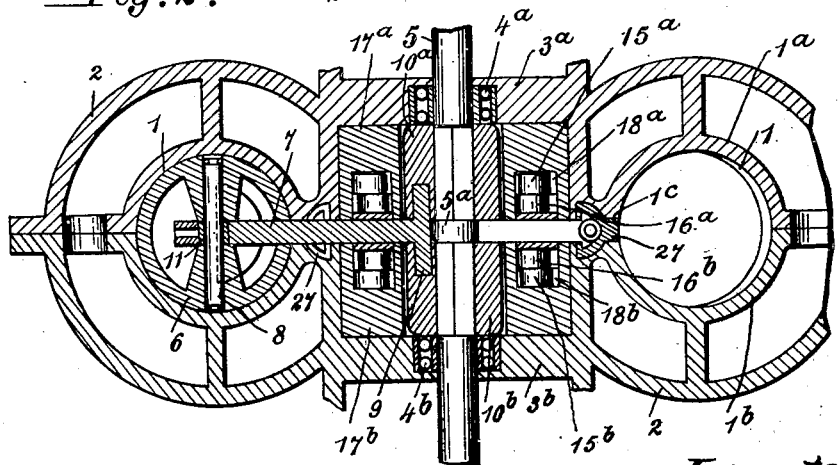
Fig. 2 is a horizontal section on the line 2—2 of Fig. 1.

In the example herein represented, the torus 1, whose generatrix is a circle, consists of two half-shells 1a and 1b which are assembled by bolts or otherwise and are surrounded by a wall 2 forming a jacket for water circulation. The said wall is extended on each side towards the axis of the torus by the parts 3a and 3b in which are mounted ball bearings 4a and 4b carrying the driving shaft 5 which is coaxial with the torus.

In the said torus 1 are mounted the pistons 6 which are seven in number in this construction. The mean length of said pistons is such that sufficient spaces are left between them in order to form working chambers of suitable volume. The pistons 6 are connected with the shaft 5 by piston rods 7 which are pivoted to said pistons by axles 8 and are provided at their other ends with journals 9 by which they are rotatably mounted, with equal spacing, between two rotor plates 10a and 10b, which are secured to the shaft 5 by a hexagonal fitting and are held in the separate position by a shoulder 5a formed on the said shaft.

Each of the pistons 6 is susceptible of a certain angular movement with reference to the shaft 5, by oscillation about the journal 9. In order to provide for the lengthening of the piston rod 7 when the axle 8 of the piston becomes separated from the plane passing through the axis of the shaft 5 and the axis of the journal 9, a certain clearance is provided between the axle 8 and the end of the piston rod. For this purpose (Figs. 3 and 4) the axle 8 has a square cross section and is mounted in a ring 11 about which the end 7a of the piston rod 7 can rotate; said ring has an aperture 11a which is lengthened towards the end of the piston rod, in order to allow the axle 8 to slide in the radial direction.

Due to the clearance which is thus allowed in the mounting of the pistons 6 upon the ends of the piston rods, said pistons, under the action of the centrifugal force which is freely exercised upon them, would tend to produce an excessive friction upon the periphery of the torus, thus resulting in a premature wear of the latter and of the corresponding part of the pistons. In order to obviate this drawback, the interior of each piston—which is hollow and is closed by a screwed plate 6a—contains a centripetal compensator for counterbalancing the action of the centrifugal force. This device comprises a heavy mass 12 which is slidable upon the end of the piston rod 7 and makes contact with the ends of two oscillating levers 13a and 13b which are pivoted to the end of the piston rod 7a by means of axles 14a and 14b; said levers also bear upon the axle 8. Under the action of the centrifugal force, the mass 12 tends to move towards the periphery of the torus 1, and it exercises pressure upon the ends of said levers which tend to pivot upon their axles and to press in the contrary direction against the axle 8. If the weight of the mass 12 has a certain relation to the weight of the piston 6 (for instance ⅓), and if the lengths of the levers 13a and 13b are in the inverse ratio (3:1) the centripetal action exercised by said levers upon the axle 8 will be practically the equivalent of the centrifugal action on the piston, and will counteract the effects of the latter.

Figure 8:
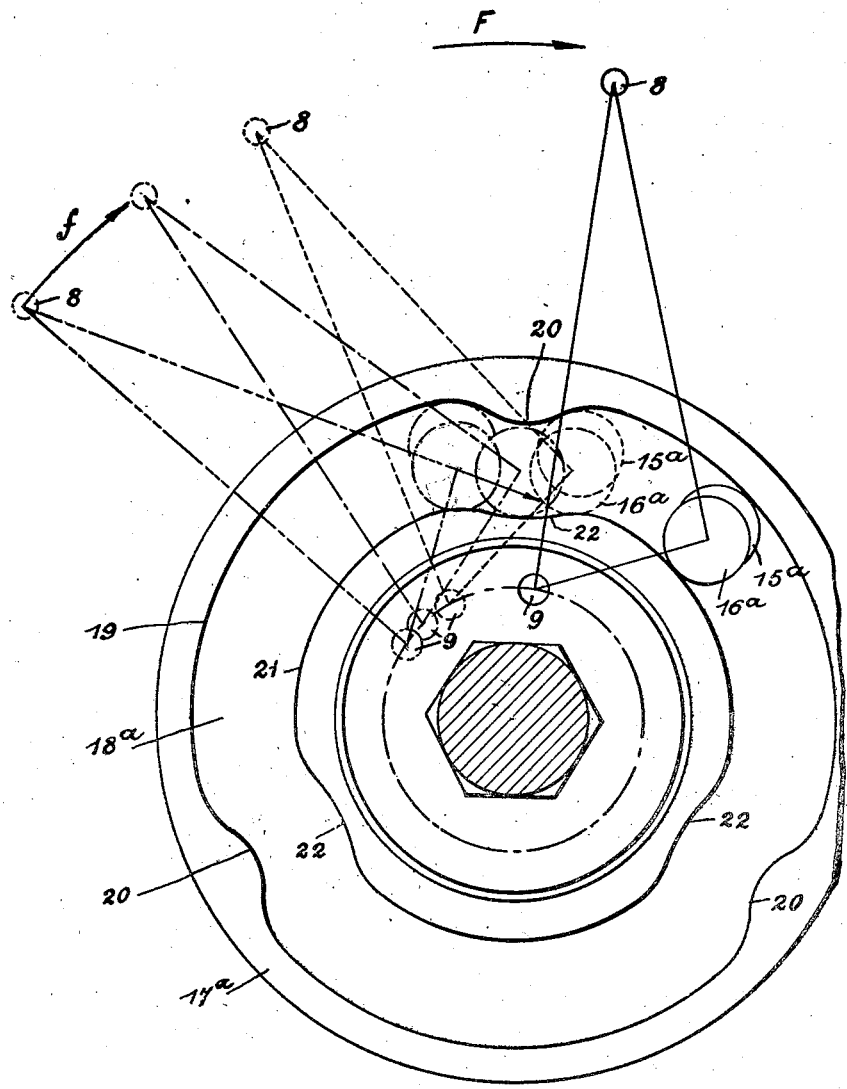
Fig. 8 is a diagrammatic view showing the operation of the device for acceleration and for the fastening of the pistons.

The piston rods 7 (Figs. 5 to 7) have on the side next their axles 9 a lateral appendage 7a of forked shape, enabling them to fit into one another, and upon the branches of the fork are mounted two respective rollers 15a and 15b, and two rollers 16a and 16b which are eccentric with reference to the first. Surrounding the rotor plates 10a and 10b are two rings 17a and 17b, which rings are formed with grooves 18a and 18b, with the rollers 15a and 16a and 15b and 16b operating in these grooves respectively. The outer edge 19 of each groove (Fig. 8) has a general circular outline, but it has at regular intervals the ramps 20 of special outline, which are three in number in this case. The inner edge 21 of each groove has a circular outline concentric with the edge 19, with recesses 22 of special form corresponding to the ramps 20. The two cams 19—21 which are thus formed in each of the rings 17a—17b serve as roller races, one being used for the rollers 15a—15b and the other for the rollers 16a—16b, and they are arranged as will be further explained, in order to assure three power-producing cycles for each working chamber formed between two successive pistons, per revolution of the shaft 5.

In the wall of the torus 1 are formed the ports 23 spaced at 120° apart and adapted to admit the fuel mixture; on the periphery of the torus, at the proper points, are provided three exhaust conduits 24. Three spark-plugs 25 are mounted at the periphery.

The working chambers in the interior of the torus are made leakless by elastic packing members 26 which are mounted in the known manner upon each piston. In a middle groove 1c in the torus in which the piston rods 7 are slidable, are packing members 27 which are mounted between the piston rods and consist of torus-shaped segments whose cross-section corresponds to that of the groove 1c; they are recessed, and have in their middle part a transverse partition 27a carrying two projections 27b serving to guide and support two springs 28 which bear at the other end upon the piston rod 7, around projections 7b provided on the latter. Said springs 28 maintain the packing member 27 in the axis of the space between two consecutive piston rods, while permitting the said rods to oscillate. The elasticity of the said packing is assured by a longitudinal slot 27c.

The operation of the engine is as follows:

At the end of the suction stroke, each working chamber has its maximum volume. If the engine is supposed to rotate in the direction of the arrow F, the piston which bounds this chamber in the rear will then be in its middle position, that is, its axis 8, the axis 9 of the end of the piston rod and the axis of the shaft 5 will be in line. The rollers 15a—15b and 16a—16b of the rod 7 of said piston will now roll upon the circular parts of the cams 19—21. When the rollers come upon the ramps 20—22, an oscillation is given to the piston rod 7 about its axis 9 in the direction of the arrow f, and the motion of the piston is accelerated; said piston approaches the piston immediately preceding it, thus compressing the fuel mixture contained in the working chamber in front of it and causing a suction in the chamber in its rear. The end of the compression stroke will practically take place when the rollers 15a—15b and 16a—16b attain the point of lowest depression of the ring 22. At this time the working chamber is adjacent one of the spark-plugs 25, and the ignition and explosion now takes place. Such a position for the pistons 6A and 6B is shown in Fig. 1.

Due to the expansion, the front piston 6B is driven in the direction of rotation of the driving shaft. Since the rollers 15a—15b and 16a—16b of its rod 7 are now engaged upon the circular part of the cams 19 and 21, said piston cannot move with reference to the shaft 5, and it imparts the whole of its power to the latter. The rear piston 6A has such position that the rollers of its rod are engaged upon the second inclined parts of the ramps 20—22, and thus it is prevented from returning to the rear by the effect of the reaction. The effect of this reaction also tends to turn the rod 7 of the piston 6A about the rollers 15a—15b and 16a—16b, in such manner that the reaction of the end of the piston rod 9 will be exercised upon the shaft 5 in the direction of the driving motion. Under the effect of the compression which is exercised at this time in the chamber in its rear, the piston 6A continues to move forward, and the rollers of its rod attain the circular part of their race. The piston 6A is thus in the position which was occupied by the piston 6B, and is thus ready to impart a driving effort to the shaft 5 under the action of the expansion which is about to take place in its rear; the piston 6c which follows it has now assumed the position which it occupied before, having performed work of compression. The chamber between the pistons 6c and 6A is now adjacent the spark-plug 25, and the cycle of operations recommences.

These effects take place successively for each working chamber in coincidence with each spark-plug 25, and thus in the present case there will be a total of 21 explosions per revolution of the shaft 25, that is, 21 power strokes. The outline of the cams 19—21 is such that the movements of the pistons will produce in each working chamber the properly regulated phases of the four-stroke cycle.

Figures 9, 10 and 11 show clearly the successive positions occupied by two pistons during the working cycle. In Figure 9, the rollers 15a and 16a corresponding to the first piston 6, i. e. the leading piston in the direction of rotation, turn in a circular path 19—21 of the cam groove 18a and as a result this first piston occupies its average position relative to the rotor. The rollers 15a and 16a corresponding to the second piston 6 turn in a part 20—22 of the cam groove 18a and this second piston, therefore, occupies an advance position relative to the rotor. The space entered by the two pistons 6 is, therefore, reduced to the minimum at a point corresponding to an ignition element 25 which serves to ignite the combustible mixture. As the rotation continues the rollers 15a and 16a of the first piston continue to turn in the circular groove 19—21, while the rollers 15a, 16a of the second piston leave the part 20—22 of the cam groove and enter the part 19—21. The second piston is, therefore, relatively retarded, the space between the two pistons is increased, providing for expansion of the igniting mixture.

According to Figure 10, the first piston has passed the exhaust passage 24 and the burnt gases exhaust through this passage. As the pistons advance, the inlet port 23 is uncovered and the rollers 15a and 16a of the first piston enter the part 20—22 of the cam groove 18a, as in Figure 11. The first piston is, therefore, accelerated in movement relative to the second piston, the space between the two pistons increased, and the combustible mixture drawn in through the inlet 23. As the second piston reaches the inlet port, the rollers 15a and 16a of the first piston enter the portion 19—21 of the cam groove 18a and the rollers 15a and 16a of the second piston enter the offset portion 20—22 of such cam groove. The space between the pistons is, therefore, again reduced to a minimum, as indicated in Figure 9, producing the compression of the combustible mixture, which in compressed form reaches the ignition device 25 for ignition. A complete cycle has thus been carried out and, of course, is continuously repeated.

As above stated, the construction of the engine may be varied by using a different number of pistons and of ignition devices, and of admission and exhaust ports upon the periphery of the torus. The outline of the cams will obviously depend upon these conditions. An absolute synchronism will be obtained in all cases by distributing the cycles according to angles which are equal at the centre.

The apparatus according to the said invention is susceptible of all suitable modifications as concerns the form of the several parts of its construction, and for instance, the generatrix of the torus may consist of any suitable closed curve.

I claim:

1. A means for counterbalancing the centrifugal force acting on pistons operating in a cylinder of toric form including levers forming the connecting rods of the pistons, connections between the levers and pistons to permit limited relative radial play, members carried by the piston connected ends of the angle levers and influenced in the relative movement between the pistons and said angle levers, and a weight slidable on the angle lever and influenced in the movement of said members under the centrifugal movement of the piston to counteract such centrifugal movement.

2. In a rotary engine of the type described, a piston having a transverse axis, an angle lever forming the connecting rod for the piston and cooperating with said axis, the cooperation of the angle lever and piston permitting relative movement of the piston and angle lever, members pivotally carried by the angle lever with their similar ends bearing on the axis, said members having their opposite ends extended beyond the angle lever, and a weight slidable on the angle lever and engaged and operated by said opposite ends of the members in the relative movement of the piston and angle lever, the effect of the weight on the piston and angle lever serving to substantially counteract the centrifugal force of the piston.

3. An internal combustion engine comprising a cylinder in the form of a hollow torus provided with intake and exhaust ports and firing means, pistons movable in said cylinder, said pistons being independent from one another, a shaft arranged at the axis of the torus, a rotor mounted on the shaft, angle levers pivoted to said rotor and having a relative sliding connection with the pistons, rings surrounding the rotor, cam grooves in said rings, said cam grooves comprising circular portions concentric with the shaft of the engine and inwardly curved portions, a pair of rollers on each side of said angle levers, one roller of each pair rolling on the outer wall of a cam groove and the other roller of each pair rolling on the inner wall of said cam groove.

4. An internal combustion engine comprising a cylinder in the form of a hollow torus having intake and exhaust ports and firing means, the inner wall of said cylinder being formed with a slot, pistons movable in the cylinder, a shaft arranged at the axis of the torus, a rotor mounted on said shaft, levers pivotally connected to the rotor and having sliding connection with the pistons, independent sealing members operative in said slot between the levers, and springs arranged between each sealing member and the adjacent levers.

5. An internal combustion engine as defined in claim 3, wherein the rollers are arranged in relatively offset eccentric relation.

JEAN DEDIEU.